Patented Mar. 3, 1925.

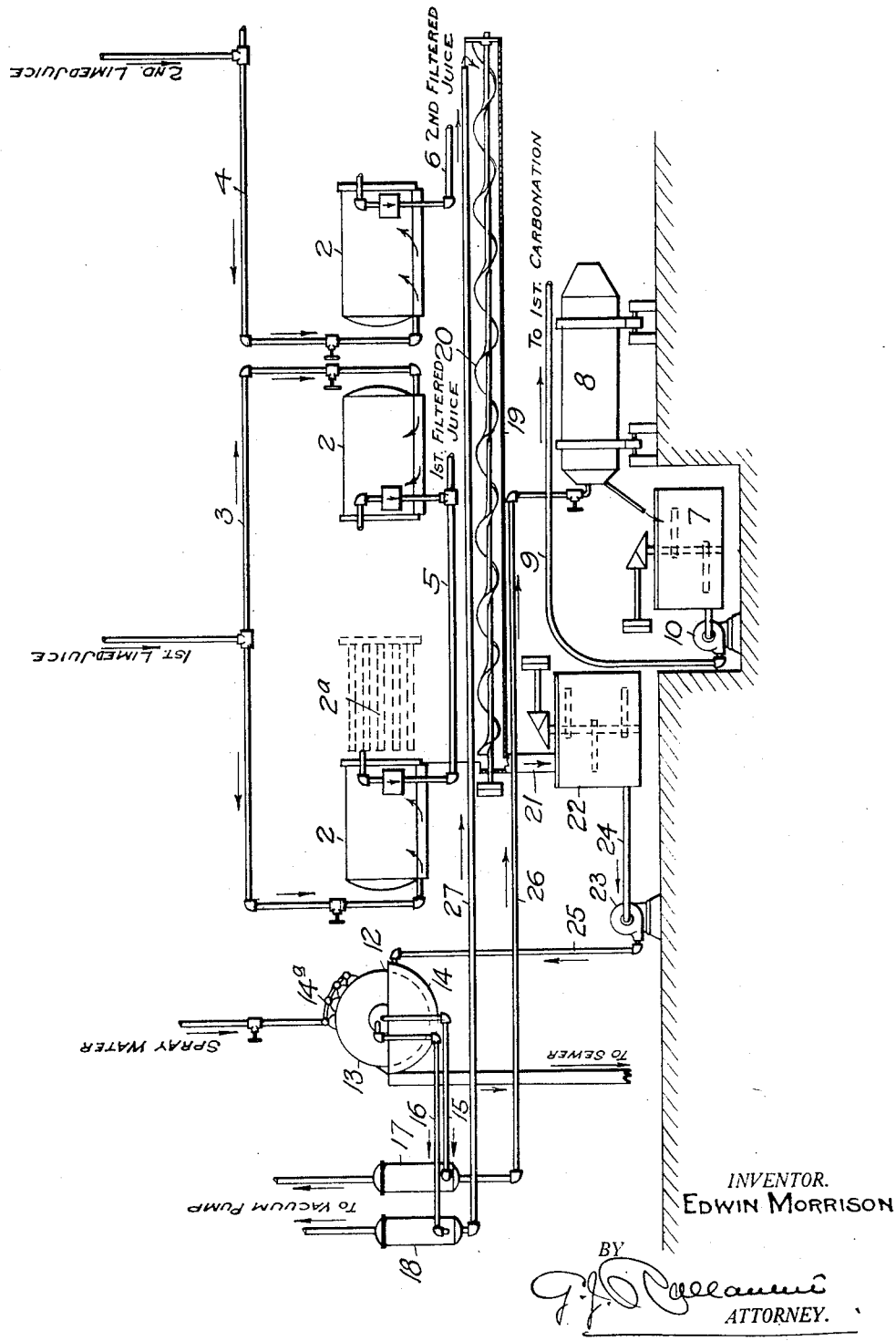

1,528,501

UNITED STATES PATENT OFFICE.

EDWIN MORRISON, OF DENVER, COLORADO, ASSIGNOR TO THE GREAT WESTERN SUGAR COMPANY, OF DENVER, COLORADO, A CORPORATION OF NEW JERSEY.

PROCESS OF MANUFACTURING SUGAR.

Application filed May 12, 1920. Serial No. 380,804.

*To all whom it may concern:*

Be it known that I, EDWIN MORRISON, a citizen of the United States, residing at Denver, in the county of Denver and State of Colorado, have invented certain new and useful Improvements in Processes of Manufacturing Sugar, of which the following is a specification.

This invention relates to certain new and useful improvements in a process of manufacturing sugar and more particularly in the process of sugar production in which sugar juices in a mixture or raw sugar juices and lime are expressed from the solid constituents thereof by mechanical filteration.

According to the usual practice a carbonated mixture of slacked lime and raw sugar juices is passed through filter-presses for the extraction of the sugar-charged liquids, and the lime-mud remaining in the presses after the liquid has been expressed therefrom is subjected to a washing action for the purpose of recovering the sugar still contained therein.

The sweet wash water is usually employed in slacking the lime and the residual mud is discarded as a waste product of the process.

The filters commonly used in the process are of the intermittent type in which the extraction of the limed sugar juices is alternated with washing and subsequent removal of the residual solids which form in cakes upon the filtering medium.

It is apparent that the periodic interruptions in the operation of the filter presses, to wash and remove the mud cakes, involve time and labor which materially increases the cost of production, and it is the primary object of the present invention to shorten the periods of inactivity of the filters by providing means for filtering and washing the lime mud residue thereof in a separate and concurrent operation.

Another object of my invention is to increase the quantity of sugar produced by a more complete extraction of the sugar content of the filter-mud, and still another object is to economize in the use of water and consumption of fuel for evaporation of the sugar carrying liquids produced in the presses.

In carrying out my improved process I provide a system of cooperatively connected devices shown diagrammatically in the accompanying drawings in which the reference numerals 2 designate the usual filter presses which receive their charge through pipes 3 and 4 and which discharge their filtrate through conduits 5 and 6.

A milk of lime obtained from a lime slacker 8 is thoroughly stirred in a mixing vat 7 and the mixture is delivered through a pipe 9 to the carbonation vats by the use of a pump 10 where it meets with the raw sugar juices.

In carrying out my invention I employ an auxiliary filter 12 preferably of the continuous air-pressure type in which a partially submerged rotary carrier covered peripherally with a porous filtering fabric, is the medium for separating the sugar charged liquid from a mixture of liquid and solids.

The carrier has beneath its porous covering a plurality of circumferential compartments in connection with a common outlet and the liquid contained in material collecting upon the surface of the carrier is expressed into said compartments by an excess of external pressure produced through a partial vacuum at the outlet or other convenient expedients.

The solids deposited upon the circumference of the carrier are subjected to a wash after its immergence and the wash water carrying the remainder of the sugar contents of the charge is discharged separate from the first filtrate through the medium of an automatic valve movement connected with the carrier.

In the drawings the reference numeral 14 designates the tank of the auxiliary filter, 13 the rotary carrier, 14ª the system of conduits through which the wash waters are supplied, 15 the discharge pipe for the first filtrate, and 16 the discharge pipe for the second or wash filtrate, both said pipes being connected with a vacuum pump through the intermediary of receivers 17 and 18.

A trough 19 is disposed beneath the filters to receive the mud collected on their frames 2ª, after the latter have been withdrawn from their respective housings as indicated in broken lines, and a screw conveyor 20 works in the trough to carry the mud to a discharge-opening at an end thereof, which by means of a spout is connected with a mixing vat 22.

A pump 23 draws the contents of the vat through pipes 24 and 25 to the auxiliary filter, the filtrate discharged from the auxiliary filter through the conduit 15 is conducted to the lime slacker 8 through a pipe 26, and the sugar-charged wash water drawn from the filter through the pipe 16 is conveyed to the trough 19 through a pipe 27.

In the operation of my process, the limed sugar-juices are after carbonation, conducted to the filter presses 2 in which the liquid is expressed from the lime mud which collects on the filter frames.

After the filters are filled with solids to their full capacity and the surrounding juice has been discharged, the frames are withdrawn from their housings as indicated in broken lines in the drawings and the mud cakes adhering thereto are caused to drop into the receiving trough 19.

The lime mud together with the sweet wash water supplied from the auxiliary filter through the conduit 27, are conveyed to the tank 22 in which they are mixed by mechanical agitation.

The lime mud milk thus produced is pumped to the auxiliary filter in which the entrained sugar is removed from the solids carried in suspension as hereinbefore explained, the first filtrate being conducted to the lime-slacker through the conduit 26 for use in preparing the charge for the filter presses and the second filtrate or sweetened wash water being discharged into the trough 19 for use in diluting the lime mud removed from the filters.

The mud adhering to the carrier of the auxiliary filter after the washing operation is completed, is removed by a scraper or other suitable means and discharged as waste.

It will be understood that in case the discharge from the auxiliary filter is insufficient to dilute the mud cakes discharged from the filters, to the desired density, liquid obtained from other sources may be supplied to either the trough 19 or the mixing vat 22.

From the above it is clear that in my process water is only used to wash the mud in the second press or set of presses and the enriched sweet water is added to the lime mud from the first presses to form a lime-mud-milk. Thereafter the latter is filtered on the second press or set of presses to produce a sweet water still further enriched in its sugar content. The latter is used to prepare the charge for the first set of presses. This is to be distinguished from the processes at present in use in which a mixture of water and sweet water is used to prepare the charge for the first presses. While in the prior art processes and in my processes the term "sweet water" is applied to the fluid used to prepare the hydrated lime charge, there is a great deal of difference in the quality and the sugar content of each, due to different handling through each process. My process saves water and fuel to finally evaporate this water by causing this water to perform three continuous functions: (1) wash the final mud, (2) elutriate the mud between the first and second presses, and (3) in combination with the incoming new lime hydrate, to prepare the charge for the first presses. In the prior art processes the water is uneconomically used as it is divided, part being added to the mud in the first press or presses and part in the second press or presses and the mixture being used to prepare the charge for the first press or presses.

Broadly stated, my process comprises the production of an enriched sweet water for use in preparing the hydrated lime charge by mixing lime mud derived from the filtering of raw carbonated limed juices with sweetened wash water, filtering, and utilizing the still further enriched sweet water of relatively high sugar content to prepare the hydrated lime charge whereby the volume of water is reduced to a minimum. The process is a continuous one and provides for the extraction of the sugar contents of mud discharged from the ordinary intermittent filter presses in a continuous operation, the latter being accomplished by the employment of a continuous auxiliary filter.

What I claim and desire to secure by Letters-Patent is:

1. In a process of manufacturing sugar, wherein sugar-juices are expressed from a lime mud by filtration, removing the lime mud after the filtering operation, diluting the lime mud to obtain a lime mud milk, separating the liquid from the suspended solids in said milk in a filtering operation separate from the other, forcing a wash water through the residue of the second filtration to recover the sugar content thereof, and utilizing the so sweetened wash water to dilute the lime mud of the first filtration which on filtration provides a still further enriched sweet water adapted to be used to prepare the hydrated lime charge.

2. In a process of manufacturing sugar, wherein sugar juices are expressed from a lime mud obtained from limed sugar juices by filtration, removing the lime mud after the filtering operation, diluting the lime mud to obtain a lime mud milk, separating the liquid from the suspended solids in said milk in a filtering operation separate from the other, utilizing the filtrate of the second filtration in preparing the limed sugar juices prior to the first filtration, forcing a wash-water through the residue of the second filtration to recover its sugar-content, and utilizing the so sweetened wash water in diluting the residue of the first filtration which on filtration provides a still further enriched sweet water adapted to be used to prepare the hydrated lime charge.

3. In a process of manufacturing sugar, wherein sugar juices are expressed from a lime mud by filtration, removing the lime mud after the filtering operation, diluting the lime mud by mechanical agitation to obtain a lime mud milk, separating the liquid from the suspended solids in said milk in a filtering operation separate from the other, forcing a wash water through the residue of the second filtration to recover its sugar content, and utilizing the so sweetened wash water in diluting the residue of the first filtration which on filtration provides a still further enriched sweet water adapted to be used to prepare the hydrated lime charge.

4. The cyclic process of treating lime mud derived from the filtering of raw limed juices comprising mixing the lime mud with sweet wash water, filtering, and utilizing the still further enriched sweet water of relatively high sugar content to prepare the hydrated lime charge whereby the volume of water in circulation is reduced to a minimum.

5. The process of continuously producing an enriched sweet water comprising diluting the lime mud derived from the filtering of raw carbonated limed juices, filtering the diluted lime-mud-milk, washing the solid residue resulting therefrom with unsweetened wash water to produce a sweet wash water, mixing the latter with additional lime mud derived from filtering the carbonated limed juices, filtering the resulting product to provide a still further enriched sweet water of relatively high sugar content and utilizing the latter to prepare the hydrated lime charge whereby the volume of water in circulation is reduced to a minimum.

In testimony whereof I have affixed my signature.

EDWIN MORRISON.